(12) United States Patent
An

(10) Patent No.: US 11,873,028 B2
(45) Date of Patent: Jan. 16, 2024

(54) FRONT VEHICLE BODY STRUCTURE

(71) Applicants: Hyundai Motor Company, Seoul (KR); Kia Corporation, Seoul (KR)

(72) Inventor: Byeongdo An, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/846,850

(22) Filed: Jun. 22, 2022

(65) Prior Publication Data

US 2023/0025443 A1  Jan. 26, 2023

(30) Foreign Application Priority Data

Jul. 20, 2021  (KR) .................. 10-2021-0094583

(51) Int. Cl.
| | | |
|---|---|---|
| *B62D 25/08* | (2006.01) | |
| *B62D 25/04* | (2006.01) | |
| *B62D 25/02* | (2006.01) | |
| *B62D 29/00* | (2006.01) | |
| *B62D 25/14* | (2006.01) | |
| *B62D 25/16* | (2006.01) | |

(52) U.S. Cl.
CPC .......... *B62D 25/08* (2013.01); *B62D 25/025* (2013.01); *B62D 25/04* (2013.01); *B62D 29/008* (2013.01); *B62D 25/14* (2013.01); *B62D 25/16* (2013.01)

(58) Field of Classification Search
CPC ...... B62D 25/04; B62D 25/08; B62D 25/081; B62D 25/082; B62D 25/085; B62D 25/088; B62D 29/008
USPC .............. 296/203.01, 2, 193.06, 9, 204, 198
See application file for complete search history.

(56) References Cited

U.S. PATENT DOCUMENTS

| | | | | |
|---|---|---|---|---|
| 7,296,824 B2 * | 11/2007 | Yasui | ..................... | B62D 25/04 |
| | | | | 296/203.02 |
| 9,988,095 B2 * | 6/2018 | Maier | .................... | B62D 21/15 |

FOREIGN PATENT DOCUMENTS

| | | | | |
|---|---|---|---|---|
| EP | 3887230 B1 * | 10/2022 | ............. | B62D 25/04 |
| KR | 101689575 B1 | 12/2016 | | |

* cited by examiner

*Primary Examiner* — Dennis H Pedder
(74) *Attorney, Agent, or Firm* — Slater Matsil, LLP

(57) ABSTRACT

An embodiment front vehicle body structure includes a fender apron upper member, a front side member coupled to a front portion of the fender apron upper member, and a front pillar unit coupled to a rear portion of the front side member and a rear portion of the fender apron upper member, the front pillar unit including an aluminum material.

20 Claims, 9 Drawing Sheets

FRONT VEHICLE BODY STRUCTURE

CROSS-REFERENCE TO RELATED APPLICATIONS

This application claims the benefit of Korean Patent Application No. 10-2021-0094583, filed on Jul. 20, 2021, which application is hereby incorporated herein by reference.

TECHNICAL FIELD

An exemplary embodiment of the present invention relates to a front vehicle body structure.

BACKGROUND

As a way to improve the fuel efficiency of a vehicle, research on reducing the weight of the vehicle body continues.

In other words, the vehicle industry is concentrating on the development of a vehicle body structure that may simultaneously achieve improved strength and reduced weight while satisfying stricter laws related with vehicle collision.

In general, the front vehicle body is extended along the length direction of the vehicle and is provided with front side members disposed on the left and right sides along the width direction of the vehicle.

The front part of the fender apron upper member is coupled to the front part of the front side member. A dash panel and a front pillar assembly connected to a side sill are coupled to the rear portion of the front side member and the rear portion of the fender apron upper member.

In such a front pillar assembly, the load path area along the front and rear direction of the vehicle body is not sufficient, so there is a possibility that the front impact load (collision energy) may not be properly distributed.

In addition, in general, since separate connecting parts for reinforcing the connectivity of the front pillar assembly are required, there is a problem in that the number of vehicle body parts, weight and cost are increased however the connection strength may not be increased.

The above information disclosed in this background section is only for enhancement of understanding of the background of the invention, and therefore it may contain information that does not form the prior art that is already known to a person of ordinary skill in the art.

SUMMARY

An exemplary embodiment of the present invention relates to a front vehicle body structure. Particular embodiments relate to an assembled structure of a front pillar of a vehicle body.

Embodiments of the present invention provide a front vehicle body structure that may reduce the number of parts and reduce cost and weight, increase the strength of the front vehicle body, and improve front crash performance.

A front vehicle body structure according to an exemplary embodiment of the present invention may include front side members combined with a front part of each fender apron upper member respectively, and front pillar units coupled to the rear portion of each of the front side member and the rear portion of each of the fender apron upper member, and made of aluminum material.

Each of the front pillar units may include a front rib reinforcement coupled to the rear portion of the front side member and the rear portion of the fender apron upper member, and a rear rib reinforcement integrally formed with the front rib reinforcement, and coupled to a front part of a side sill and a front part of a side panel.

The front rib reinforcement may include a first flange coupled to the rear of the fender apron upper member, a second flange extending from the first flange to the upper portion of the rear rib reinforcement, and a third flange extending from the first flange to the lower portion of the rear rib reinforcing part.

The front rib reinforcement may include an outer rib formed along the rear extension direction of the fender apron upper member and the front side member on the exterior surface along the vehicle width direction of the front rib reinforcement, and integrally connected to the rear rib reinforcement.

The outer rib may include a plurality of first reinforcing ribs extending along the front and rear direction of the vehicle body, and at least one second reinforcing rib connected with a plurality of the first reinforcing ribs up and down.

The rear rib reinforcement may include an inner rib formed along the rear extension direction of the fender apron upper member and the front side member on the inner side along the vehicle width direction of the rear rib reinforcement, and integrally connected to the front rib reinforcement.

The inner rib may include at least one third reinforcing rib extending along the front-rear direction of the vehicle body.

The rear rib reinforcement may include a side panel mount side formed on the exterior surface along the vehicle width direction, and at least one door hinge mount surface formed on the side panel mount side.

The rear rib reinforcement may include at least one combining boss extending inward from the exterior surface along the vehicle width direction.

The at least one combining boss may include a first combining boss disposed along the rear extension direction of the fender apron upper member, and a second combining boss disposed along the rear extension direction of the front side members.

The at least one combining boss may be combined with a dash inner panel disposed on the inner side along the vehicle width direction of the rear rib reinforcement.

A box space may be formed inside the first combining boss, and at least one first vertical rib extending vertically may be disposed in the box space.

At least one door hinge mount surface may be formed on the exterior surface of the rear rib reinforcement, and at least one first engage boss may be formed on the inner side of the rear rib reinforcement along the vehicle width direction and the at least one first engage boss is formed to protrude inward in the vehicle width direction in the corresponding at least one door hinge mount surface.

The at least one first engage boss may be connected to at least one first connecting rib extending from the inner surface of the rear rib reinforcement.

At least one second engage boss may be formed on the inner surface of the rear rib reinforcement along the vehicle width direction.

The at least one second engage boss may be connected with at least one second connecting rib extending from the inner surface of the rear rib reinforcement.

A member mount surface which overlaps the front pillar upper member may be formed on the upper part of the rear rib reinforcement.

The lower part of the rear rib reinforcement may be coupled to the rear part of the front side member and the front part of the side sill through an extension bracket.

Exemplary embodiments of the present invention may reduce the number of parts, the weight and the cost, increase the skeletal strength and connectivity of the front vehicle body, and improve front crash performance.

In addition, the effects obtainable or predicted by the embodiments of the present invention are to be disclosed directly or implicitly in the detailed description of the embodiments of the present invention. That is, various effects predicted according to embodiments of the present invention will be disclosed in the detailed description to be described later.

BRIEF DESCRIPTION OF THE DRAWINGS

Embodiments herein may be better understood by reference to the following description in connection with the accompanying drawings in which like reference numerals refer to identical or functionally similar elements.

Figure 1:
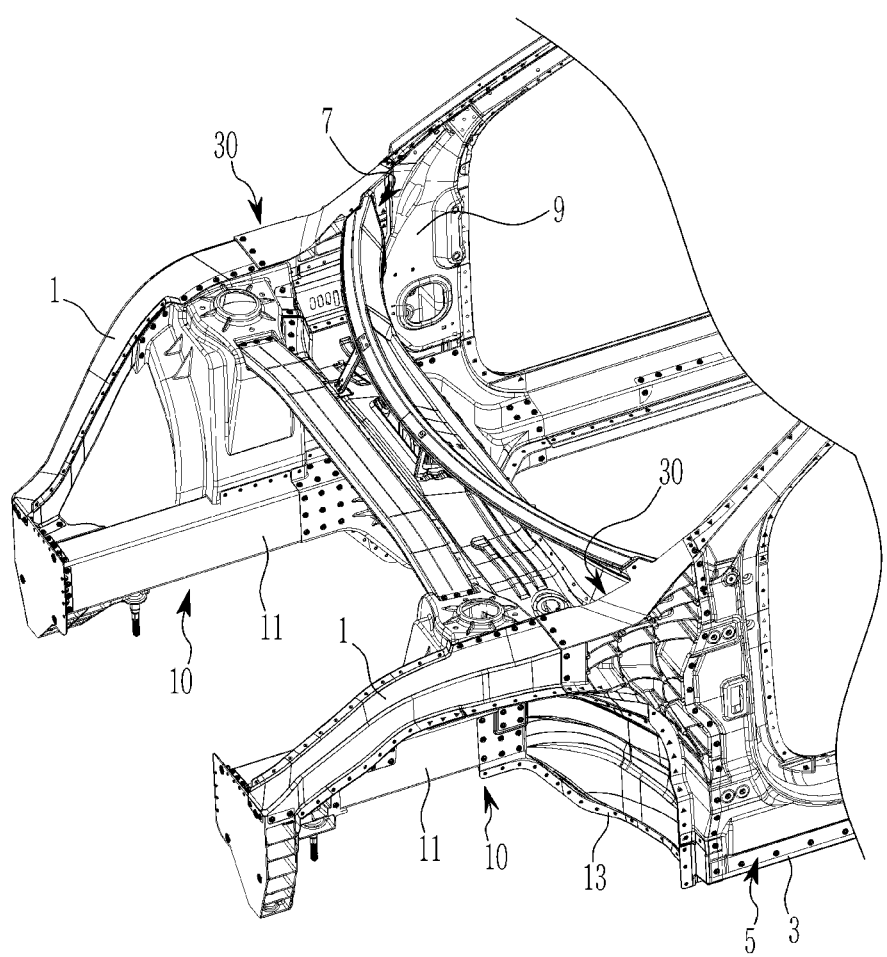
FIG. 1 and FIG. 2 are perspective views showing a front vehicle body structure according to an exemplary embodiment of the present invention.

The drawings referenced above are not necessarily drawn to scale, but are to be understood as presenting rather simplified representations of various preferred features illustrating the basic principles of embodiments of the present invention. Certain design features of embodiments of the present invention, including, for example, particular dimensions, direction, position, and shape will be determined in part by the particular intended application and environment of use.

The following reference identifiers may be used in connection with the accompanying drawings to describe exemplary embodiments of the present disclosure.

| | |
|---|---|
| 1: fender apron upper member | 3: side sill |
| 5: side panel | 7: front dash panel |
| 8: front pillar upper member | 9: dash inner panel |
| 10: front side member | 11: member body |
| 13: lower side outer panel | 30: front pillar unit |
| 31: aluminum die casting member | 33: upper and lower coupling line |
| 35: section line | 40: front rib reinforcement |
| 41: first flange | 42: second flange |
| 43: third flange | 44: fourth flange |
| 45: outer rib | |

-continued

| | |
|---|---|
| 49: second reinforcing rib | 47: first reinforcing rib |
| 61: side panel mount side | 60: rear rib reinforcement |
| 64: second door hinge mount surface | 63: first door hinge mount surface |
| 65: first combining boss | 69: inner rib |
| 67: second combining boss | 73: second engage boss |
| 71: first engage boss | 77: second box space |
| 75: first box space | 78b: second vertical rib |
| 78a: first vertical rib | 81: first connecting rib |
| 79: third reinforcing rib | 85: member mount surface |
| 83: second connecting rib | |
| 87: extension bracket | LP: load path |
| 100: front vehicle body structure | |

DETAILED DESCRIPTION OF ILLUSTRATIVE EMBODIMENTS

The terminology used in this specification is for the purpose of describing specific exemplary embodiments, and is not intended to limit the present invention.

As used in this specification, the singular forms are also intended to include the plural forms, unless the context clearly dictates otherwise.

The terms 'comprising' and/or 'including' as used in this specification indicate the presence of specified features, integers, steps, operations, elements and/or components, but at least one other feature, integer, step, operation, element and/or component may be present. It should also be understood that this does not exclude the presence or addition of steps, operations, components, and/or groups thereof.

As used in this specification, the term 'and/or' includes any one or all combinations of at least one associated listed item.

In this specification, the term 'coupled' or 'connected' means that components are directly connected to each other by welding, SPR (Self Piercing Rivet), FDS (Flow Drill Screw), structural adhesive, etc. or indirectly connected through at least one intermediary component, and physical relationship between two components.

The terms 'vehicle', 'of a vehicle' or other similar terms used in this specification are generally used in passenger automobiles, including passenger vehicles, sport utility vehicles (SUVs), buses, trucks, and various commercial vehicles, and also including hybrid vehicles, electric vehicles, hybrid electric vehicles, hydrogen power vehicles and other alternative fuel vehicles (e.g., fuels derived from resources other than petroleum).

Hereinafter, exemplary embodiments of the present invention will be described in detail with reference to the accompanying drawings.

Figure 2:
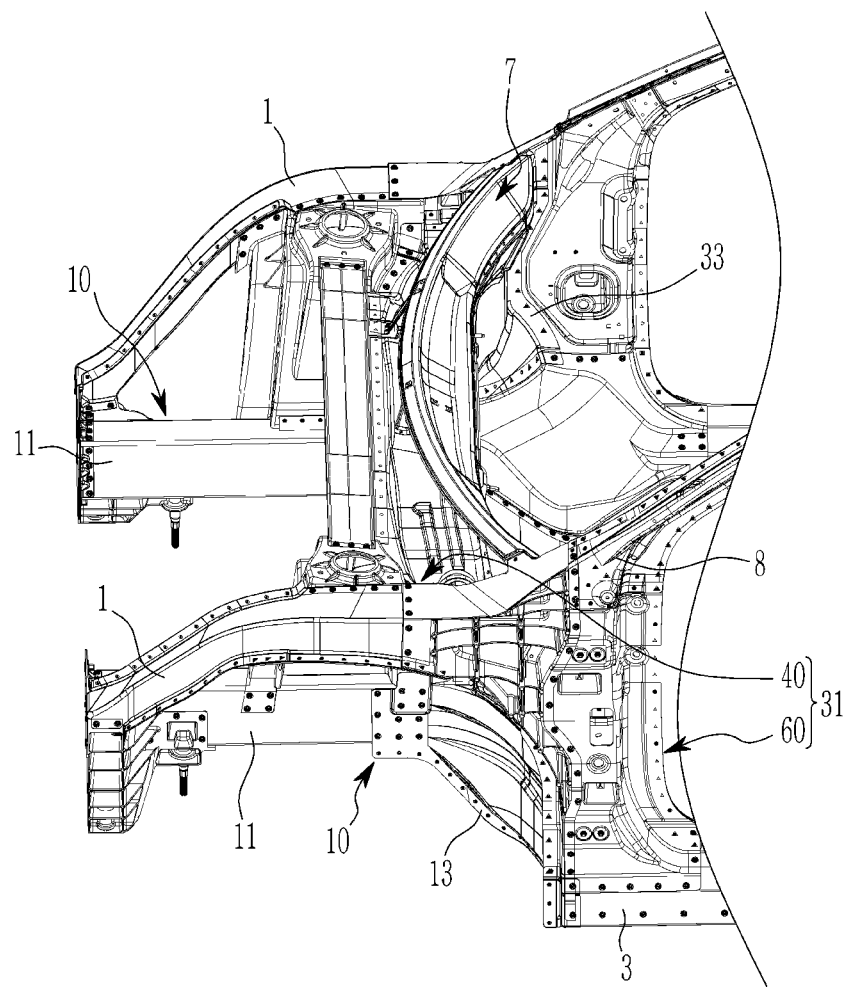

FIG. 1 and FIG. 2 are perspective views showing the front vehicle body structure according to an exemplary embodiment of the present invention.

Referring to FIG. 1 and FIG. 2, a front vehicle body structure 100 according to an exemplary embodiment of the present invention may be applied to a front structure of the vehicle in which various front structures are connected.

Here, the front vehicle body structure 100 is a front structure positioned between the occupant room and the engine room of the vehicle, and functions to protect the occupant room by effectively supporting the collision load input from the vehicle front.

In this specification, 'vehicle body front and rear direction' may be defined as the length direction of the vehicle body, 'vehicle width direction' may be defined as the left and right direction of the vehicle body, and 'vertical direction' may be defined as the height direction of the vehicle body.

In addition, in this specification, 'inside the vehicle width direction' may be defined as an inner region (e.g., inner surface) between constituent elements that face each other and are spaced apart, and 'outside the vehicle width direction' may be defined as an outer area (e.g., exterior surface) of constituent elements.

Furthermore, in this specification, 'upper end portion', 'upper portion', 'upper end' or 'upper surface' of constituent elements indicates 'end portion', 'end part', or face of the constituent elements that are relatively upper in the drawing, and of the constituent elements 'lower end portion', 'lower portion', 'lower end' or 'lower surface' of constituent elements indicates 'end portion', 'end part', or face of the constituent elements that are relatively lower in the drawing.

Furthermore, in this specification, the end of the constituent elements (e.g., one end or the other end, etc.) indicates the end of the constituent elements in any one direction, and an end portion of constituent elements (e.g., one end portion or another end portion, etc.) represents a certain part of the constituent elements including the end.

The front vehicle body structure 100 according to an exemplary embodiment of the present invention is configured such that it may reduce the number of parts and reduce cost and weight, increase the strength of the front vehicle body, and improve front crash performance.

The front vehicle body structure 100 according to an exemplary embodiment of the present invention may include, basically, both front side members 10 and a front pillar unit 30 coupled to the front side members 10.

In an exemplary embodiment of the present invention, both sides of the front side member 10 are extended in the front and rear direction of the vehicle body and disposed on the left and right sides respectively along the vehicle width direction.

In one example, each of the two front side members 10 includes a member body 11, shaped as for example a rectangular box-shape, and a lower side outer panel 13 joined to the rear of the member body 11.

Each of these two front side members 10 is well known to a person of an ordinary skill in the art, so a further detailed description will be omitted.

In another example, each of the front side members 10 as described above may be manufactured by an aluminum extrusion method.

Here, the front part of the fender apron upper member 1 is coupled to a front part of the front side member 10.

The front part of the fender apron upper member 1 may be coupled to the front part of the member body 11.

In an exemplary embodiment of the present invention, the front pillar unit 30 (also commonly referred to as an 'A pillar unit') is disposed between the occupant room and the engine room in the front part of the side vehicle body including a side sill 3 and a side panel 5 on both sides.

The front pillar unit 30 transmits a load input from the front part of the vehicle body (e.g., a front impact load) to the rear of the vehicle body.

The front pillar unit 30 may transmit the front impact load of both front side members 10 and the fender apron upper member 1 to the side sills 3, the side panels 5 and the front pillar upper members 8. That is, the front pillar unit 30 is configured to form a plurality of load paths LP (referring to FIG. 5) that passes to the rear of the vehicle body.

The front pillar unit 30 is coupled to the rear portions of each of the front side members 10 and the rear portions of the fender apron upper member 1 on both sides.

Hereinafter, each rear portion of the both front side member 10 may be defined as a rear portion of the lower side outer panel 13.

The front part of the front pillar unit 30 may be coupled to the rear part of the front side member 10 and the rear part of the fender apron upper member 1.

In addition, the rear portion of the front pillar unit 30 may be coupled to the front portion of the side sill 3 and the front portion of the side panel 5.

Further, each of the front pillar units 30 is coupled to both ends of the front dash panel 7 disposed along the vehicle width direction from the front part of the vehicle body.

Both ends of the front dash panel 7 are coupled to the inner side of the front pillar unit 30 along the vehicle width direction.

In one example, each of the front pillar units 30 may be manufactured by an aluminum die casting method.

Each of the front pillar units 30 is made of an aluminum die casting member 31 as a single structure in which the side member 10, the fender apron upper member 1, the side sill 3, the side panel 5, and the front dash panel 7 may be mounted.

Figure 3:
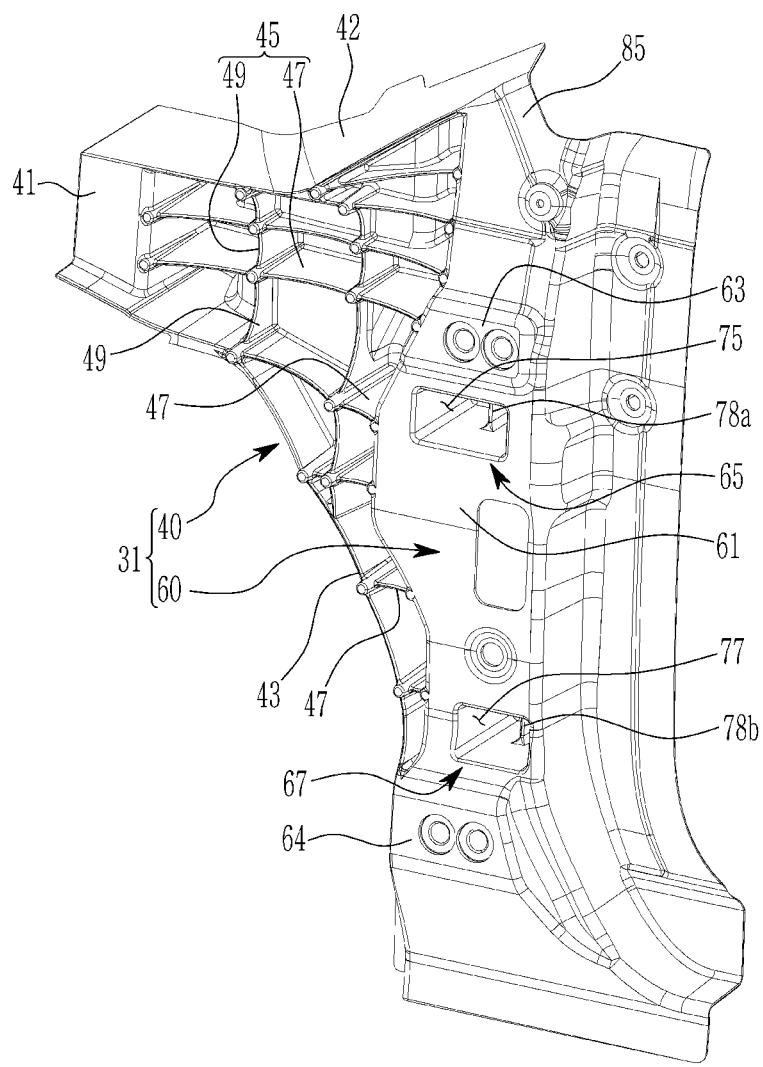
FIG. 3 and FIG. 4 are perspective views showing a front pillar unit applied to the front vehicle body structure according to an exemplary embodiment of the present invention viewed from outside.
Figure 4:
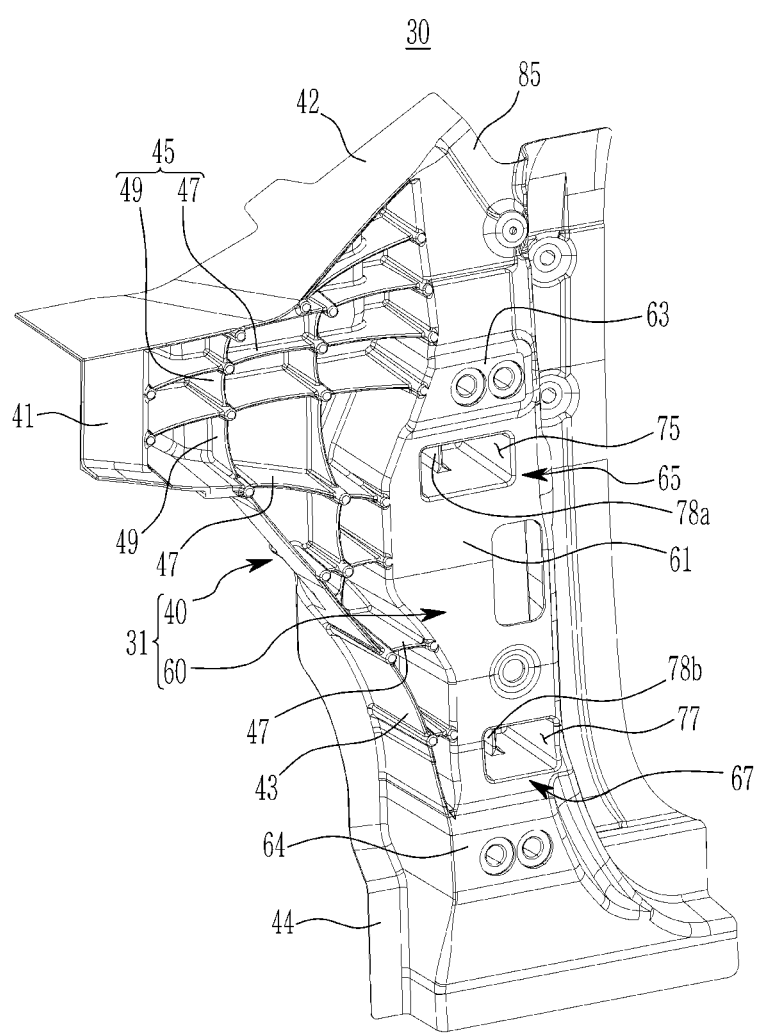
Figure 5:
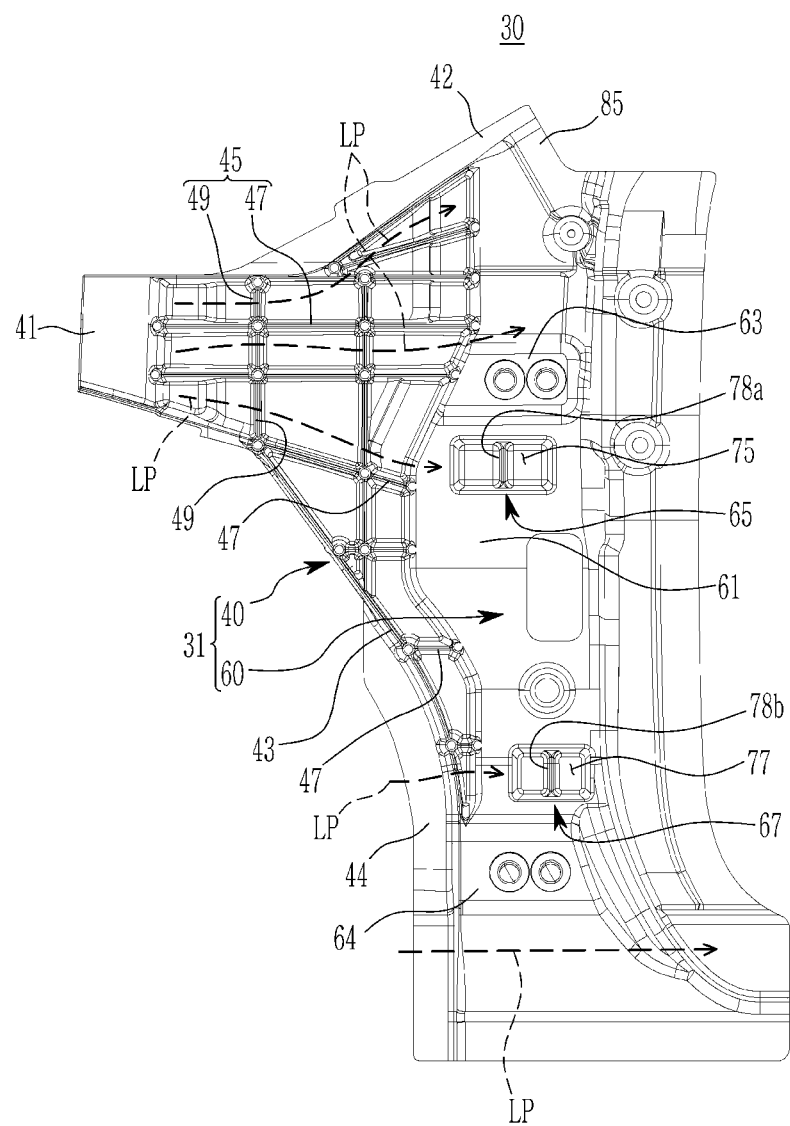
FIG. 5 is an external side view showing a front pillar unit applied to the front vehicle body structure according to an exemplary embodiment of the present invention.
Figure 6:
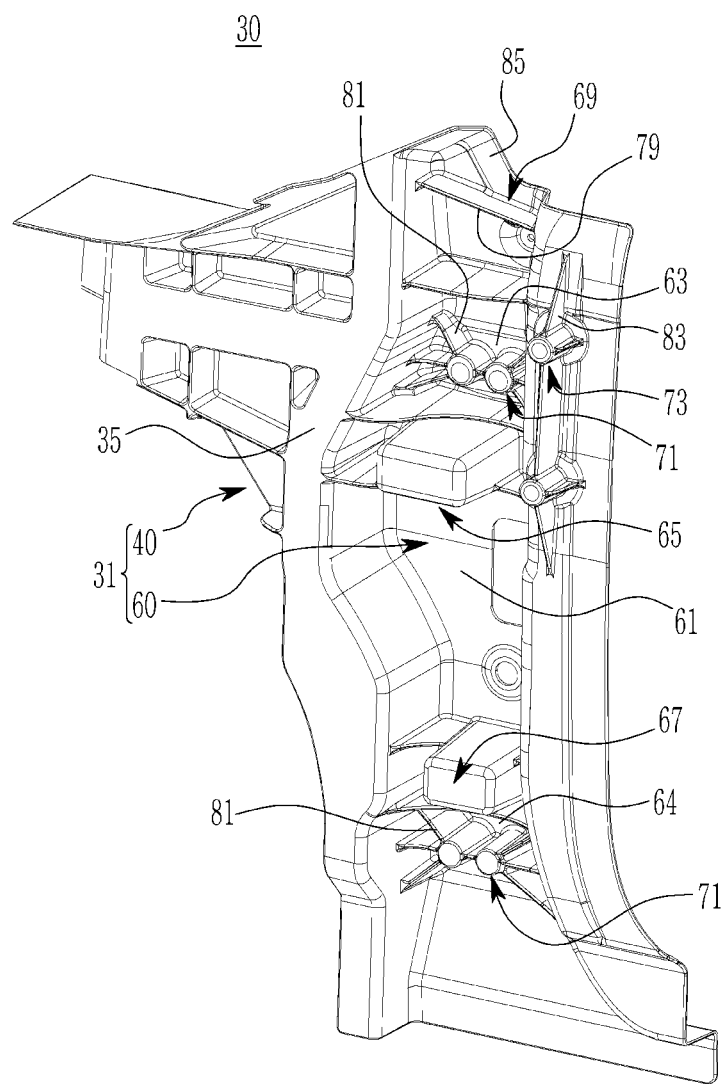
FIG. 6 and FIG. 7 are perspective views showing a front pillar unit applied to the front vehicle body structure according to an exemplary embodiment of the present invention viewed from inside.
Figure 7:
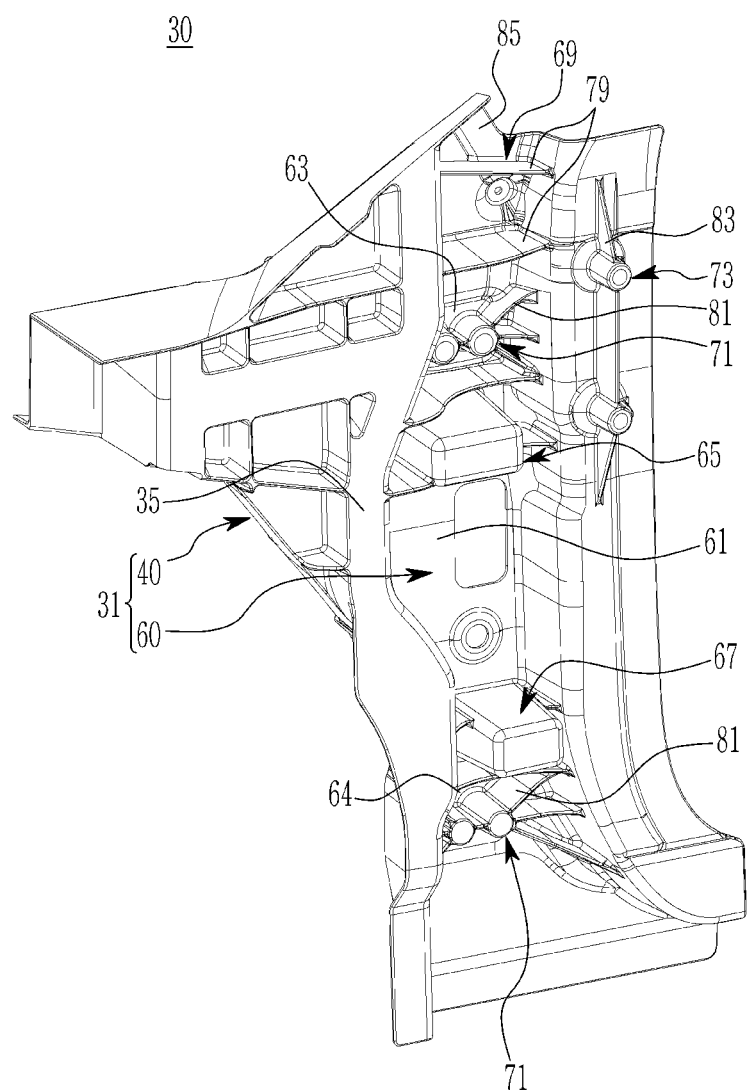
Figure 8:
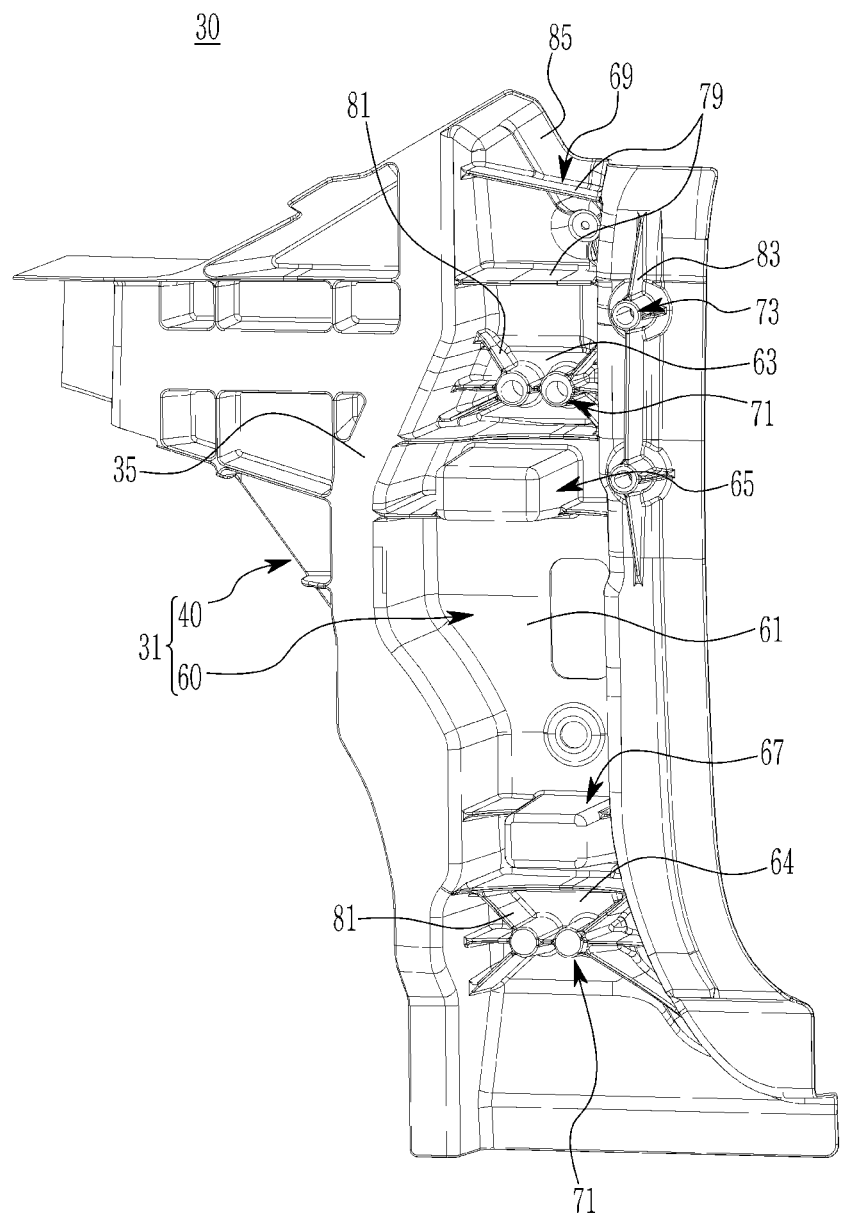
FIG. 8 is an internal side view showing a front pillar unit applied to the front vehicle body structure according to an exemplary embodiment of the present invention.

FIG. 3 and FIG. 4 are perspective views showing a front pillar unit applied to the front vehicle body structure according to an exemplary embodiment of the present invention viewed from outside. FIG. 5 is an external side view showing a front pillar unit applied to the front vehicle body structure according to an exemplary embodiment of the present invention. FIG. 6 and FIG. 7 are perspective views showing a front pillar unit applied to the front vehicle body structure according to an exemplary embodiment of the present invention viewed from inside. FIG. 8 is an internal side view showing a front pillar unit applied to the front vehicle body structure according to an exemplary embodiment of the present invention.

Hereinafter, the front pillar unit 30 applied to the front vehicle body structure 100 according to an exemplary embodiment of the present invention will be described in detail with reference to the drawings.

Referring to FIG. 1 to FIG. 8, each of the front pillar units 30 according to an exemplary embodiment of the present invention may include a front rib reinforcement 40 as a front and a rear rib reinforcement 60 as a posterior based on the upper and lower coupling line 33 (referring to FIG. 2) of the front dash panel 7 connected to its inner side.

The front rib reinforcement 40 is coupled to the rear portion of the front side member 10 and the rear portion of the fender apron upper member 1.

And, the rear rib reinforcement 60 is integrally formed with the front rib reinforcement 40 and is coupled to the front part of the side sill 3 and the front part of the side panel 5.

The front rib reinforcement 40 absorbs the collision load input from the front part of the vehicle body and transmits it to the rear rib reinforcement 60.

And, the rear rib reinforcement 60 transmits the front crash load transmitted from the front rib reinforcement 40 to the rear of the vehicle body through the side sill 3 and the side panel 5.

That is, the front rib reinforcement 40 and the rear rib reinforcement 60 may form multiple load paths LP to transmit the front collision load from the front side member 10 and the fender apron upper member 1 to the side sill 3, etc.

Furthermore, the front pillar upper member 8 may be coupled to the upper portion of the rear rib reinforcement 60.

And, on the inner side of the rear rib reinforcement 60 along the vehicle width direction, a dash inner panel 9 connected to the aforementioned front dash panel 7 may be combined. Referring to FIG. 6, on the inner side of the front pillar unit 30 along the vehicle width direction, a section line 35 partitioning the front rib reinforcement 40 and the rear rib reinforcement 60 along the vehicle body front and rear directions is formed.

In the section line 35, both ends of the front dash panel 7 are joined to form the upper and lower coupling line 33 shown in FIG. 2.

In an exemplary embodiment of the present invention, the front rib reinforcement 40 includes a first flange 41, a second flange 42, a third flange 43, and an outer rib 45.

The first flange 41 is provided on the front part of the front rib reinforcement 40 and is coupled to the rear part of the fender apron upper member 1.

The second flange 42 extends from the first flange 41 to the upper portion of the rear rib reinforcement 60.

The second flange 42 may be formed by extending obliquely in the upward direction toward the upper portion of the rear rib reinforcement 60. In addition, the third flange 43 extends from the first flange 41 to the lower portion of the rear rib reinforcement part 60.

The third flange 43 extends toward the lower part of the rear rib reinforcement 60 in an arc shape, and is connected to the lower part of the rear rib reinforcement 60.

Referring to FIG. 4, a fourth flange 44 is integrally formed on the third flange 43.

The fourth flange 44 is coupled to the rear portion of the front side members 10.

The outer rib 45 reinforces the strength of the front pillar unit 30, absorbs the collision load input from the front part of the vehicle body, and transfers it to the rear rib reinforcement 60.

The outer rib 45 is designed to form multiple load paths LP from the front rib reinforcement 40 to the rear rib reinforcement 60.

The outer rib 45 is formed along the rear extension direction of the fender apron upper member 1 and the front side member 10 on the exterior surface along the vehicle width direction of the front rib reinforcement 40, and is integrally connected to the rear rib reinforcement 60.

The outer rib 45 is connected to the first flange 41, the second flange 42, and the third flange 43, and is disposed between the second flange 42 and the third flange 43.

The outer rib 45 comprises a plurality of first reinforcing ribs 47 and at least one second reinforcing rib 49.

A plurality of first reinforcing ribs 47 is designed to integrally connect the first flange 41, the second flange 42, and the third flange 43 and the rear rib reinforcement 60.

A plurality of first reinforcing ribs 47 extend along the vehicle body front and rear directions from the first flange 41, the second flange 42, and the third flange 43, and are integrally connected to the rear rib reinforcement 60.

And, the at least one second reinforcing rib 49 extends vertically from at least one of the plurality of first reinforcing ribs 47.

In one example, the at least one second reinforcing rib 49 may be provided in plurality.

At least one of a plurality of second reinforcing ribs 49 may form a lattice shape by connecting the plurality of first reinforcing ribs 47 up and down.

In an exemplary embodiment of the present invention, the rear rib reinforcement 60 may include a side panel mount side 61, at least one door hinge mount surface 63 and 64, at least one combining boss 65 and 67, an inner rib 69, at least one first engage boss 71, and at least one second engage boss 73.

The side panel mount side 61 is formed on the exterior surface along the vehicle width direction of the rear rib reinforcement 60 to combine the front part of the side panel 5.

The at least one door hinge mount surface 63 and 64 is adapted to engage the mounting portion (not shown) of the door hinge (not shown).

The at least one door hinge mount surface 63 and 64 is formed protrude outward along the vehicle width direction from the side panel mount side 61.

In one example, the at least one door hinge mount surface may include a first door hinge mount surface 63 and a second door hinge mount surface 64.

The first door hinge mount surface 63 is disposed on the upper side of the rear rib reinforcement 60 and connected to the outer rib 45 of the front rib reinforcement 40.

And, the second door hinge mount surface 64 is disposed on the lower side of the rear rib reinforcement 60.

The at least one combining boss 65 and 67 is to be combined with the dash inner panel 9 disposed on the inner surface along the vehicle width direction of the rear rib reinforcement 60.

The at least one combining boss 65 and 67 is formed to extend inward from the exterior surface along the vehicle width direction of the rear rib reinforcement 60.

In one example, the at least one combining boss may include a first combining boss 65 and a second combining boss 67.

The first combining boss 65 is disposed along the rear extension direction of the fender apron upper member 1.

And, the second combining boss 67 is disposed along the rear extension direction of the front side members 10.

The first combining boss 65 and the second combining boss 67 may form multiple load paths LP connected to the outer rib 45 of the front rib reinforcement 40.

In one example, the first combining boss 65 and the second combining boss 67 may be provided in a rectangular box shape.

A first box space 75 is formed inside the first combining boss 65, and a second box space 77 is formed inside the second combining boss 67.

In the first box space 75, at least one first vertical rib 78*a* is disposed extending vertically to the first combining boss 65 formed direction, and in the second box space 77, at least one second vertical rib 78*b* is disposed extending vertically to the second combining boss 67 formed direction.

The inner rib 69 supports the front impact load transmitted through the outer rib 45 and transmits it to the front side member 10, the side sill 3, and the fender apron upper member 1.

That is, the inner rib 69 is configured to form a plurality of load paths LP connected to the outer rib 45.

The inner rib 69 is formed along the rear extension direction of the fender apron upper member 1 and the front side member 10 on the inner side along the vehicle width direction of the rear rib reinforcement 60, and is integrally connected to the front rib reinforcement 40.

This inner rib 69 includes at least one third reinforcing rib 79 extending along the front-rear direction of the vehicle body.

In one example, the at least one third reinforcing rib 79 may be provided in plurality.

A plurality of third reinforcing ribs 79 may be disposed to be spaced apart from each other at predetermined intervals along the vertical direction from the inner surface along the vehicle width direction of the rear rib reinforcement 60.

And, one of the plurality of third reinforcing ribs 79 may be integrally connected with the first combining boss 65, and another one may be integrally connected with the second combining boss 67.

The at least one first engage boss 71 is adapted to engage the above-mentioned mounting part of the door hinge to at least one door hinge mount surface 63 and 64.

The at least one first engage boss 71 is formed on the inner side of the rear rib reinforcement 60 along the vehicle width direction.

The at least one first engage boss 71 is formed to protrude inward in the vehicle width direction in the corresponding at least one door hinge mount surface 63 and 64.

In one example, the at least one first engage boss 71 may be provided in plurality.

One pair of a plurality of first engage bosses 71 is formed to protrude in the vehicle width direction from the first door hinge mount surface 63, and may be disposed in a position adjacent to the first combining boss 65 along the vehicle body front and rear directions.

In addition, the other pair of the plurality of first engage bosses 71 is formed to protrude in the vehicle width direction on the second door hinge mount surface 64, and may be disposed along the vehicle body front and rear directions in a position adjacent to the second combining boss 67.

Such a plurality of first engage bosses 71 is connected to at least one first connecting rib 81 extending from the inner surface of the rear rib reinforcement 60.

In one example, the at least one first connecting rib 81 may be provided in plurality.

A plurality of first connecting ribs 81 is adapted to distribute a load concentrated on the plurality of first engage bosses 71.

The at least one second engage boss 73 is adapted to engage a front cowl crossbar (not shown) disposed in the vehicle width direction from the front part of the vehicle body.

The at least one second engage boss 73 is formed on the inner surface of the rear rib reinforcement 60 along the vehicle width direction.

The at least one second engage boss 73 is formed to protrude from the upper part of the rear rib reinforcement 60 to the inside in the vehicle width direction.

In one example, the at least one second engage boss 73 may be provided as a pair on the upper portion of the rear rib reinforcement 60.

A pair of the second engage bosses 73 are disposed to be spaced apart in the vertical direction on the upper portion of the rear rib reinforcement 60.

The second engage boss 73 is connected with at least one second connecting rib 83 extending from the inner surface of the rear rib reinforcement 60.

In one example, the at least one second connecting rib 83 may be provided in plurality.

A plurality of the second connecting ribs 83 is adapted to distribute the load concentrated on a pair of second engage bosses 73.

On the upper part of the rear rib reinforcement 60, a member mount surface 85 is formed that may overlap the front pillar upper member 8 mentioned above.

The member mount surface 85 may be combined with the front part of the front pillar upper member 8.

Figure 9:
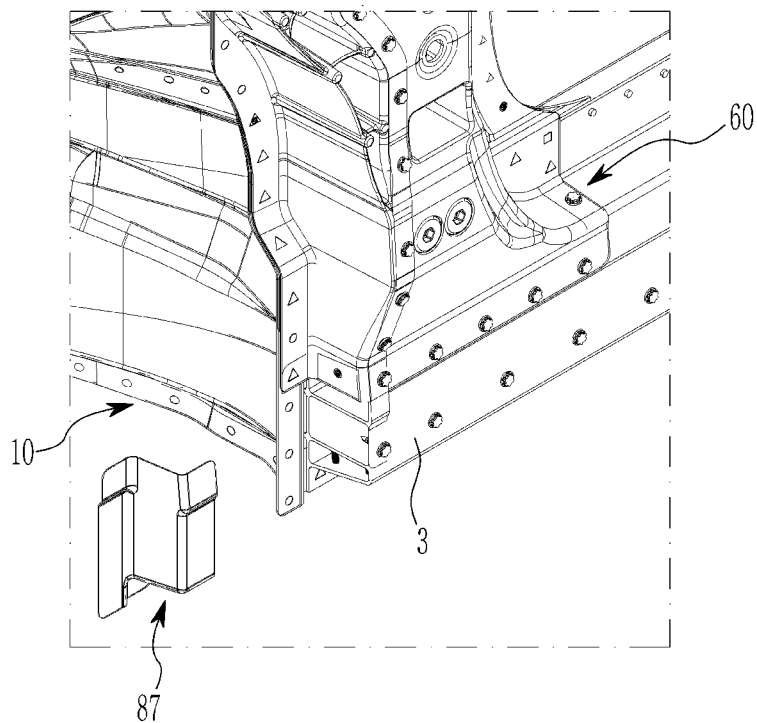
FIG. 9 is a drawing showing an extension bracket portion applied to the front vehicle body structure according to an exemplary embodiment of the present invention.

As shown in FIG. 9, the lower part of the rear rib reinforcement 60 may be coupled to the rear part of the front side member 10 and the front part of the side sill 3 through an extension bracket 87.

The extension bracket 87 is connected to the lower part of the rear rib reinforcement 60, the rear part of the front side member 10, and the front part of the side sill 3, and serves to close the open front end of the side sill 3.

Hereinafter, referring to FIG. 1 to FIG. 9, the operation of the front vehicle body structure 100 according to an exemplary embodiment of the present invention will be described.

Each front side member 10 is attached to a respective front pillar unit 30 at a respective aluminum die casting member 31.

The front part of the fender apron upper member 1 is coupled to each front part of the front side member 10 on both sides.

Each of the front pillar units 30 is coupled to each rear part of both front side members 10 and to the rear part of the fender apron upper member 1, and is coupled to each front part of the side sills 3 and each front part of the side panels 5.

Here, both ends of the front dash panel 7 are coupled to the section line 35 on the inner side of the front pillar unit 30 along the vehicle width direction.

Each of these front pillar units 30 includes the front rib reinforcement 40 and the rear rib reinforcement 60 integrally connected based on the upper and lower coupling line 33 of the front dash panel 7 coupled to section line 35.

The front rib reinforcement 40 is coupled to the rear portion of the front side member 10 and the rear portion of the fender apron upper member 1.

The rear rib reinforcement 60 is coupled to the front part of both side sills 3 and the front part of both side panels 5.

Here, the front pillar upper member 8 is coupled to the upper part of the rear rib reinforcement 60.

The lower part of the rear rib reinforcement 60 integrally connected with the lower part of the front rib reinforcement 40 is coupled to the rear part of the front side member 10 and the front part of the side sill 3 through the extension bracket 87.

And, on the inner side of the rear rib reinforcement 60 along the vehicle width direction, the front dash panel 7 and the connected dash inner panel 9 are combined.

Furthermore, the front rib reinforcement 40 includes the outer rib 45.

And, the rear rib reinforcement 60 includes the door hinge mount surface 63 and 64, the combining boss 65 and 67, the inner rib 69, and the engage boss 71 and 73.

In the above, the dash inner panel 9 is combined with the combining bosses 65 and 67.

In one of the engage bosses 71, and 73, the mounting part (not shown) of the door hinge (not shown) is engaged, and in the other, a front cowl crossbar disposed in the vehicle width direction from the front part of the vehicle body (not shown) is engaged.

The front vehicle body structure 100 according to an exemplary embodiment of the present invention may effectively support the front side member 10, the fender apron upper member 1, the side sill 3, and the side panel 5 by the front rib reinforcement 40 and the rear rib reinforcement 60 of the front pillar unit 30.

The front vehicle body structure 100 according to an exemplary embodiment of the present invention may effectively absorb the front collision load input from the front part of the vehicle body through the outer rib 45.

In addition, the front vehicle body structure 100 according to an exemplary embodiment of the present invention may effectively transmit the front crash load to the rear rib reinforcement 60 through the multiple load paths LP formed by the outer rib 45.

And, the front vehicle body structure 100 according to an exemplary embodiment of the present invention may support the front crash load transmitted from the front rib reinforcement 40 through the inner rib 69 of the rear rib reinforcement 60, the door hinge mount surface 63 and 64, the combining boss 65 and 67, and the engage boss 71 and 73.

In addition, the front vehicle body structure 100 according to an exemplary embodiment of the present invention may effectively transmit the front crash load to the front side member 10, the side sill 3, and the fender apron upper member 1 by the rear rib reinforcement 60.

Therefore, the front vehicle body structure 100 according to an exemplary embodiment of the present invention may improve the front collision performance of the vehicle body by effectively distributing the collision load by the front pillar unit 30 during the front collision of the vehicle.

Further, the front vehicle body structure 100 according to an exemplary embodiment of the present invention comprises the front pillar unit 30 with an aluminum die casting material, it is possible to reduce the weight and cost of the vehicle.

Furthermore, since the front vehicle body structure 100 according to an exemplary embodiment of the present invention does not require separate connection parts for structural reinforcement by the front pillar unit 30, it is possible to reduce the number of parts, the weight and the cost.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body structure comprising:
    a fender apron upper member;
    a front side member coupled to a front portion of the fender apron upper member; and
    a front pillar unit coupled to a rear portion of the front side member and a rear portion of the fender apron upper member, the front pillar unit comprising an aluminum material, wherein the front pillar unit comprises:
        a front rib reinforcement coupled to the rear portion of the front side member and the rear portion of the fender apron upper member; and
        a rear rib reinforcement integrally formed with the front rib reinforcement and coupled to a front part of a side sill and a front part of a side panel;
    wherein a door hinge mount surface is formed on an exterior surface of the rear rib reinforcement; and
    wherein a first engage boss is formed on an inner side of the rear rib reinforcement along a vehicle width direction, the first engage boss protruding inward in the vehicle width direction in the door hinge mount surface.

2. The front vehicle body structure of claim 1, wherein the front rib reinforcement comprises:
    a first flange coupled to the rear portion of the fender apron upper member;
    a second flange extending from the first flange to an upper portion of the rear rib reinforcement; and
    a third flange extending from the first flange to a lower portion of the rear rib reinforcement.

3. The front vehicle body structure of claim 1, wherein the front rib reinforcement comprises an outer rib formed along a rear extension direction of the fender apron upper member and the front side member on an exterior surface along the vehicle width direction of the front rib reinforcement and integrally connected to the rear rib reinforcement.

4. The front vehicle body structure of claim 3, wherein the outer rib comprises:
    a plurality of first reinforcing ribs extending along a front-rear direction of a vehicle body; and
    at least one second reinforcing rib connected with the plurality of the first reinforcing ribs in a vertical direction.

5. The front vehicle body structure of claim 1, wherein the rear rib reinforcement comprises an inner rib formed along a rear extension direction of the fender apron upper member and the front side member on an inner side along the vehicle width direction of the rear rib reinforcement and integrally connected to the front rib reinforcement.

6. The front vehicle body structure of claim 5, wherein the inner rib comprises a third reinforcing rib extending along a front-rear direction of a vehicle body.

7. The front vehicle body structure of claim 1, wherein the rear rib reinforcement comprises:
    a side panel mount side formed on an exterior surface along the vehicle width direction; and
    a door hinge mount surface formed on the side panel mount side.

8. The front vehicle body structure of claim 1, wherein the first engage boss is connected to a first connecting rib extending from the inner side of the rear rib reinforcement.

9. The front vehicle body structure of claim 1, wherein a second engage boss is formed on an inner surface of the rear rib reinforcement along the vehicle width direction.

10. The front vehicle body structure of claim 9, wherein the second engage boss is connected with a second connecting rib extending from the inner surface of the rear rib reinforcement.

11. A front vehicle body structure comprising:
    a fender apron upper member;
    a front side member coupled to a front portion of the fender apron upper member;
    a front pillar unit coupled to a rear portion of the front side member and a rear portion of the fender apron upper member, the front pillar unit comprising an aluminum material, wherein the front pillar unit comprises:
        a front rib reinforcement coupled to the rear portion of the front side member and the rear portion of the fender apron upper member; and
        a rear rib reinforcement integrally formed with the front rib reinforcement and coupled to a front part of a side sill and a front part of a side panel; and
    a member mount surface overlapping a front pillar upper member and disposed on an upper part of the rear rib reinforcement.

12. The front vehicle body structure of claim 1, wherein a lower part of the rear rib reinforcement is coupled to a rear part of the front side member and the front part of the side sill through an extension bracket.

13. A front vehicle body structure comprising:
    a fender apron upper member;
    a front side member coupled to a front portion of the fender apron upper member;

a front pillar unit coupled to a rear portion of the front side member and a rear portion of the fender apron upper member, the front pillar unit comprising an aluminum material;

a front rib reinforcement coupled to the rear portion of the front side member and the rear portion of the fender apron upper member; and a rear rib reinforcement integrally formed with the front rib reinforcement and coupled to a front part of a side sill and a front part of a side panel, the rear rib reinforcement comprising, a combining boss extending inward from an exterior surface along a vehicle width direction;

wherein a door hinge mount surface is formed on an exterior surface of the rear rib reinforcement; and wherein a first engage boss is formed on an inner side of the rear rib reinforcement along the vehicle width direction, the first engage boss protruding inward in the vehicle width direction in the door hinge mount surface.

14. The front vehicle body structure of claim 13, wherein the combining boss comprises:

a first combining boss disposed along a rear extension direction of the fender apron upper member; and a second combining boss disposed along the rear extension direction of the front side member.

15. The front vehicle body structure of claim 13, wherein the combining boss is coupled to a dash inner panel disposed on an inner side of the rear rib reinforcement along the vehicle width direction.

16. The front vehicle body structure of claim 13, further comprising a box space defined inside the combining boss, wherein a vertical rib that extends vertically is disposed in the box space.

17. The front vehicle body structure of claim 13, wherein the front rib reinforcement comprises:

a first flange coupled to the rear portion of the fender apron upper member;

a second flange extending from the first flange to an upper portion of the rear rib reinforcement; and a third flange extending from the first flange to a lower portion of the rear rib reinforcement.

18. The front vehicle body structure of claim 13, wherein the front rib reinforcement comprises an outer rib formed along a rear extension direction of the fender apron upper member and the front side member on the exterior surface along the vehicle width direction of the front rib reinforcement and integrally connected to the rear rib reinforcement.

19. The front vehicle body structure of claim 11, wherein the front rib reinforcement comprises:

a first flange coupled to the rear portion of the fender apron upper member;

a second flange extending from the first flange to an upper portion of the rear rib reinforcement; and a third flange extending from the first flange to a lower portion of the rear rib reinforcement.

20. The front vehicle body structure of claim 11, wherein the front rib reinforcement comprises an outer rib formed along a rear extension direction of the fender apron upper member and the front side member on an exterior surface along a vehicle width direction of the front rib reinforcement and integrally connected to the rear rib reinforcement.

* * * * *